(12) United States Patent
Wong (10) Patent No.: US 8,336,091 B2
(45) Date of Patent: Dec. 18, 2012

(54) MULTI-LEVEL AUTHENTICATION

(75) Inventor: Daniel ManHung Wong, Palo Alto, CA (US)

(73) Assignee: Oracle International Corporation, Redwood Shores, CA (US)

( * ) Notice: Subject to any disclaimer, the term of this patent is extended or adjusted under 35 U.S.C. 154(b) by 609 days.

(21) Appl. No.: 12/552,280

(22) Filed: Sep. 1, 2009

(65) Prior Publication Data

US 2011/0055913 A1   Mar. 3, 2011

(51) Int. Cl.
*H04L 9/32* (2006.01)
(52) U.S. Cl. .................................. 726/9; 726/5
(58) Field of Classification Search .............. 726/9, 5
See application file for complete search history.

(56) References Cited

U.S. PATENT DOCUMENTS

| 2008/0168568 | A1* | 7/2008 | Brodersen et al. | 726/30 |
| 2009/0144804 | A1* | 6/2009 | Idicula et al. | 726/2 |
| 2009/0282493 | A1* | 11/2009 | Bhide et al. | 726/28 |

OTHER PUBLICATIONS

IBM Tivoli Access Manager for e-business, Version 6.0, http://publib.boulder.ibm.com/infocenter/tivihelp/v2r1/index.jsp?topic=/com.ibm.itame.doc_6.0/am60_admin74.htm, 2008, printed Dec. 9, 2009, 3 pages.

Microsoft Developer Network (MSDN), Authentication Levels (Windows), http://msdn.microsoft.com/en-us/library/aa373552(VS.85).aspx, Build date: May 28, 2009, printed Dec. 9, 2009, 1 page.

SearchSecurityChannel.com, Rogers, Russ, "Have you considered multiple levels of authentication?", http://searchsecuritychannel.techtarget.com/generic/0,295582,sid97_gci1328917,00.html, Sep. 8, 2008, printed Dec. 9, 2009, 3 pages.

* cited by examiner

*Primary Examiner* — Kambiz Zand
*Assistant Examiner* — Aubrey Wyszynski
(74) *Attorney, Agent, or Firm* — Silicon Valley Patent Group LLP; Omkar Suryadevara (57) ABSTRACT

Approaches for performing a multiple level authentication on an entity are provided. A primary authentication credential and a secondary authentication credential may be established for a user account. The primary authentication credential uniquely identifies a particular account of the software application. The secondary authentication credential uniquely identifies an entity, such as a user, application, or device, authorized to use the particular user account. Upon receiving a request to access the software application using the particular user account, a determination is made as to whether the request is accompanied by the primary authentication credentials and a secondary authentication credential associated with the particular user account. Upon determining that the request is accompanied by valid primary and secondary authentication credentials for the user account, limited access, based upon the secondary authentication credential, to the software application using the particular user account is granted.

25 Claims, 3 Drawing Sheets

MULTI-LEVEL AUTHENTICATION

FIELD OF THE INVENTION

The present invention relates to performing multiple levels of authentication on an entity.

BACKGROUND OF THE INVENTION

A software application, such as a database management system (DBMS), may support a number of different user accounts which may be used to access the software application. To use the software application, a person or computerized entity submits a username/password combination or other such authentication credential to the software application to log onto a particular user account. If the software application successfully validates the submitted authentication credential, the requesting person or computerized entity is then able to log onto the particular user account. Since each user account may have a different set of access privileges, the software application is able to manage access to sensitive resources by restricting access to the sensitive resources to only certain user accounts. Also, the software application is able to monitor and track user activity by analyzing actions performed by each user account.

There are many reasons why multiple people or computerized entities may use the same user account of a software application. One reason is that administrators and other IT personnel tend to share passwords for ease of management. For example, many people may know the password to log into a database management system as the database administrator. In times of emergency or to address a pressing situation, IT personnel may share passwords used to log into certain accounts. Also, certain software applications may only support a limited number of user accounts, and so IT personnel may be forced to share the same user account when using a software application. For example, some software applications only support a single user account that has administrator privileges. Furthermore, one or more instances of a first software application (such as a software application in the middle tier) may use a single user account to log into a second software application, such as a database management system. Thus, many IT personnel may have access to, or otherwise use, authentication credentials associated with the first software application, and may subsequently use those authentication credentials when logging into the second software application.

When multiple people or computerized entities log onto the same user account, the software application providing the user account loses the ability to distinguish between the real identities of the parties using the user account. Unfortunately, this results in a loss of accountability, as the software application cannot determine the real identity of the party using a user account. Also, the software application's ability to control access to sensitive resources managed by the software application is compromised since each party using a user account has the same level of access to the sensitive resources.

SUMMARY OF EMBODIMENTS OF THE INVENTION

Techniques are provided for performing a multiple level authentication on an entity using a multi-level authentication system. Advantageously, by employing embodiments of the invention, multiple parties may use a single user account of a service provider application in a manner that enables the service provider application to discern the real identity of each party that is using a user account of the service provider application. As a result, the service provider application may grant different parties using the same user account a different set of access privileges to resources managed by the service provider application as well as monitor the behavior of the real identity of each party using a user account of the service provider application. As used herein, a party may be a human or a computerized entity, such as a software application.

In an embodiment, a primary authentication credential is established for each user account of a service provider application. The primary authentication credential for a particular user account of the service provider application is an authentication credential which, when presented to the service provider application by a requesting party, uniquely identifies a particular user account. For example, a primary authentication credential may be implemented as a combination of a username and password or as a digital certificate.

One or more secondary authentication credentials are also established for each user account of the service provider application. A secondary authentication credential for a particular user account of the service provider application is an authentication credential, which when presented to the service provider application, uniquely identifies a particular party (such as a human, a software application, or a device) authorized to use the particular user account. A secondary authentication credential may be implemented using a variety of different mechanisms, such as a password or a digital certificate.

Upon receiving a request, from a requesting party, to access the service provider application using a particular user account, the service provider application determines if the requesting party has presented the primary authentication credential associated with the particular user account and a secondary authentication credential associated with a party authorized to use the particular user account. If the service provider application determines that the requesting party has presented the primary authentication credential associated with the particular user account and a secondary authentication credential associated with a party authorized to use the particular user account, the service provider application grants, to the requesting party, limited access to the service provider application using the particular account. The scope of the limited access granted to the requesting party may be based upon the secondary authentication credential submitted by the requesting party.

In this way, the service provider application can discern the real identity of each party that is using a user account provided by the service provider application, as each requesting party will submit a different secondary authentication credential to the service provider application. Accordingly, the service provider application may base the scope of access granted to each requesting party on the real identity of the requesting party. Further, the service provider application may differentiate the activities of different parties, even if the different parties are using the same user account. Advantageously, in certain embodiments, the service provider application is also able to enforce security policies that require parties to employ a particular software application, client, or device to access the service provider application.

Embodiments discussed in this section are not meant to suggest, describe, or teach all the embodiments discussed herein. Thus, embodiments of the invention may contain additional or different features than those discussed in this section.

BRIEF DESCRIPTION OF THE DRAWINGS

Embodiments of the present invention are illustrated by way of example, and not by way of limitation, in the figures of the accompanying drawings and in which like reference numerals refer to similar elements and in which.

DETAILED DESCRIPTION OF THE INVENTION

Approaches for performing a multiple level authentication on an entity using a multi-level authentication system are described. In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Authentication Credentials

An authentication credential, as used herein, refers to any set of digital data which may be used to authenticate the identity of a party. An authentication credential may be presented by a requesting party to an application when the requesting party wishes to log onto a particular user account of the application. The application, upon receiving the authentication credential, may evaluate the authentication credential and (assuming the authentication credential is valid) grant the requesting party access to use the particular user account. The requesting party identified by an authentication credential may either be human or a computerized entity, such as another software application or computer system.

An authentication credential may be implemented using a wide variety of techniques. For example, an authentication credential may be implemented as a username/password combination. In such an approach, if a requesting party supplies a recognized username and a password associated with the username, then the requesting party is granted access to use the user account associated with the username.

As another example, an authentication credential may be implemented as a digital certificate or token. A digital certificate or token is digital data that is used to authenticate a requesting party who wishes to use a particular user account. If a requesting party submits a digital certificate or token to an application, then the application evaluates the received digital certificate or token. If the application determines the received digital certificate or token is valid for the requested user account, then the requesting party is granted access to the requested user account. In effect, in this approach, the application trusts the entity responsible for issuing the digital certificate or token to perform the process of authenticating the requesting party, as the application will not authenticate the requesting party beyond determining whether the digital certificate or token is valid.

Digital certificates or tokens may be created using a variety of different approaches. Embodiments of the invention may implement digital certificates or tokens having different formats, sizes, and/or complexities. Digital certificates or token may also be assigned using a variety of different approaches. In an embodiment, a requesting party may submit a set of information, biometric information (such as a fingerprint or an eye retinal scan), or other personal data to an entity (sometimes referred to as an authentication server) responsible for assigning or creating digital certificates or tokens. Upon successfully validating the submitted information, the entity responsible for assigning or creating the digital certificates or tokens may assign or create a digital certificate or token to the requesting party.

In certain embodiments, digital certificates or tokens may expire after a certain length of time. After a digital certificate or token expires, it is necessary for a party to obtain a new digital certificate or token as described above.

Embodiments of the invention employ a multi-level authentication system in which a party presents a primary authentication credential and a secondary authentication credential to use a particular user account of an application. Additional details about the architecture that employs a multi-level authentication system shall now be discussed.

Architecture Overview

Figure 1:
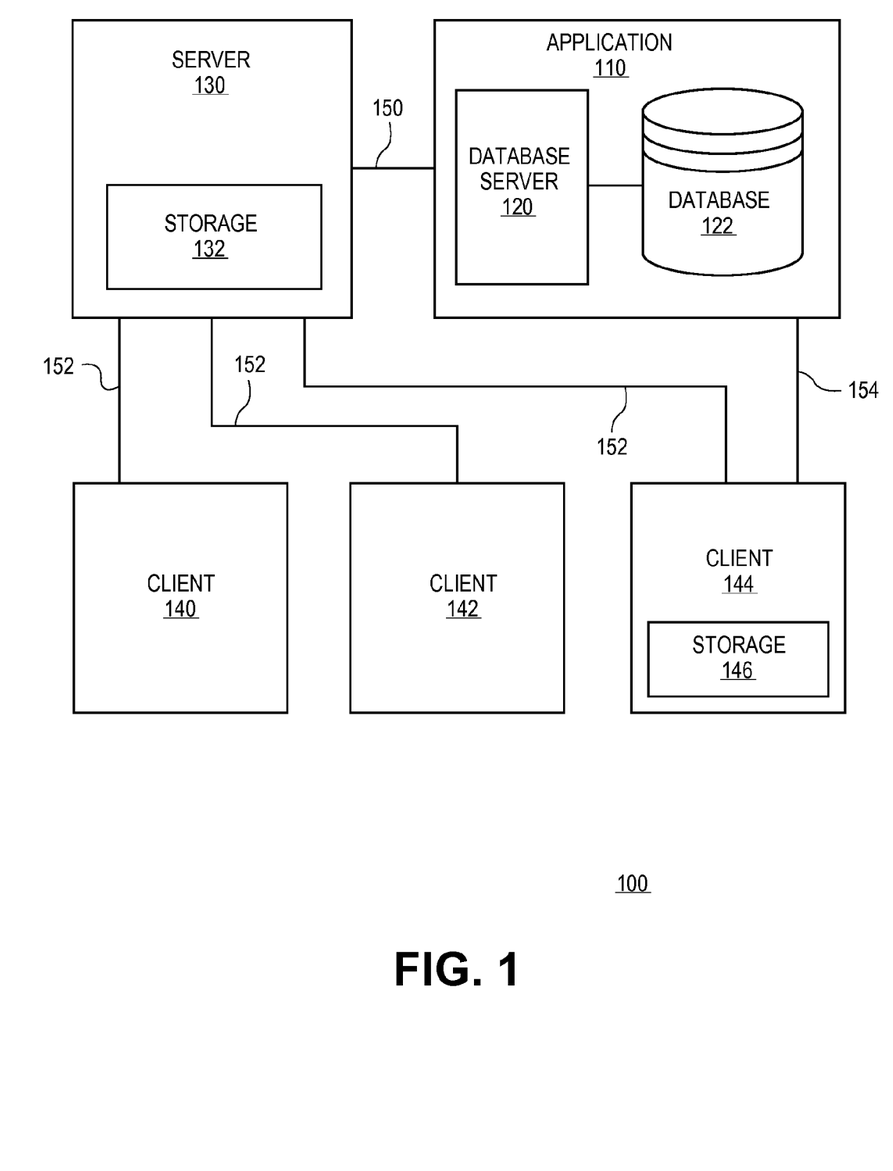
FIG. 1 is a block diagram of an illustrative system for managing access to one or more resources using a multi-level authentication system according to one embodiment of the invention.

FIG. 1 is a block diagram of an illustrative system 100 according to one embodiment of the invention. System 100 may be used to grant access to one or more resources using a multi-level authentication system. The one or more resources may be managed by a software application. System 100 includes service provider application 110, server 130, clients 140, 142, and 144, and communication links 150, 152, and 154.

Application 110, referred to hereafter as service provider application 110, represents any software application which supports a plurality of different user accounts. Non-limiting, illustrative examples of service provider application 110 include a database management system, an email server, and any other computerized entity which supports multiple user accounts.

FIG. 1 depicts service provider application 110 implemented as a database management system (DBMS) that comprises a database server 120 and a database 122. Database server 120 is a server that is capable of processing requests to store data to and retrieve data from database 122. Database 122 is a non-transitory non-volatile storage medium for storing digital data. While embodiments of the invention shall chiefly be described in the context of a database management system (DBMS), the invention may be employed in a variety of different contexts involving other types of software applications. For example, in other embodiments not depicted in FIG. 1, service provider application 110 may be implemented as an email server.

Server 130, as broadly used herein, represents any mechanism which is capable of receiving and processing requests from a client as well as communicating with service provider application 110. While server 130 is depicted in FIG. 1 as being a single entity, in other embodiments of the invention, server 130 may be implemented as two or more entities which cooperate in performing the functions described herein as being performed by server 130. Non-limiting, illustrative examples of server 130 include a web server, an application server, and the combination of a web server and an application server.

In an embodiment, server 130 comprises storage 132, which is a non-transitory non-volatile storage medium that is capable of storing one or more sets of secondary authentication credentials. In another embodiment (not depicted in FIG. 1), storage 132 may be located external to server 130, and server 130 may communicate with storage 132 to store data to and retrieve data from storage 130.

Clients 140, 142, and 144, as broadly used herein, each represent any mechanism for issuing a request to server 130 and/or service provider application 110. For example, clients 140, 142, and 144 may each be implemented using a web browser or by a software application, such as Oracle Discoverer available from Oracle Corporation of Redwood Shores, Calif.

In an embodiment, a client may issue a request to server 130, and subsequently server 130 may communicate with service provider application 110 in performing the request. In another embodiment, a client may directly communicate with service provider application 110 without assistance from server 130. For example, FIG. 1 depicts client 144 communicating directly with service provider application 110 over communications link 154.

Each client may comprise a mechanism for storing digital data. For example, as shown in FIG. 1, client 144 comprises storage 146, which is a non-volatile storage medium that is capable of storing one or more sets of secondary authentication credentials. In another embodiment (not depicted in FIG. 1), storage 146 may be located external to client 144, and client 144 may communicate with storage 146 to store data to and retrieve data from storage 146.

In an embodiment, clients 140, 142, and 144 may be considered to be part of a presentation tier, server 130 may be considered to be part of an application tier or middle tier, and service provider application 110 may be considered as part of a data tier.

Communications link 150 may be implemented by any medium or mechanism that provides for the exchange of data between server 130 and service provider application 110. Communications link 152 may be implemented by any medium or mechanism that provides for the exchange of data between server 130 and a client, such as clients 140, 142, and 144. Communications link 154 may be implemented by any medium or mechanism that provides for the exchange of data between a client, such as clients 140, 142, and 144, and service provider application 110. Non-limiting, illustrative examples of communications links 150, 152, and 154 include, without limitation, a network such as a Local Area Network (LAN), Wide Area Network (WAN), Ethernet or the Internet, one or more terrestrial, satellite or wireless links, and serial or parallel printer cables.

Having described the architecture of illustrative system 100 according to an embodiment of the invention, the process of granting access to one or more resources using a multi-level authentication system according to an embodiment of the invention shall now be described.

Granting Access Using a Multi-Level Authentication System

Figure 2:
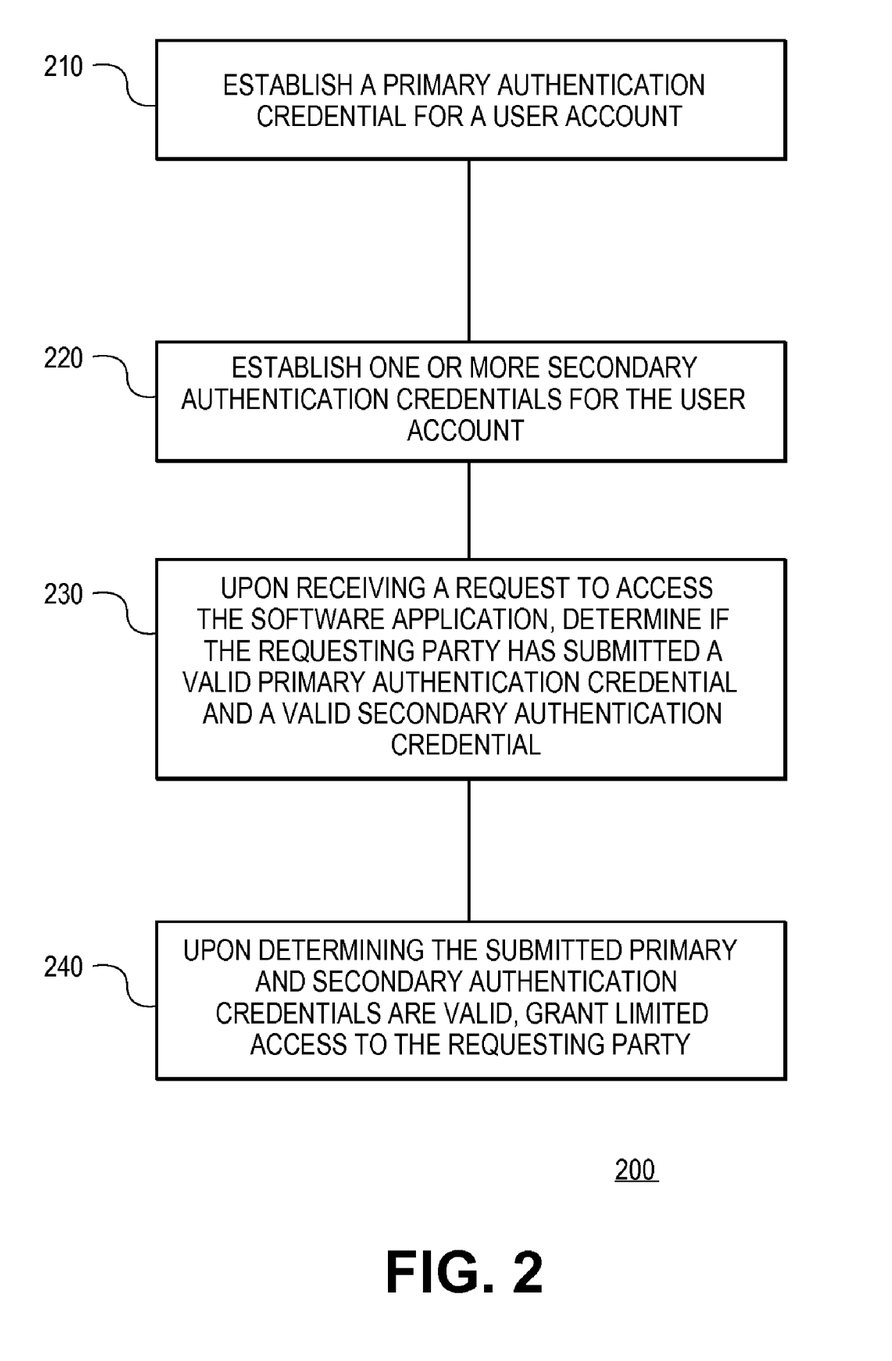
FIG. 2 is a flowchart illustrating the steps of using a multi-level authentication system according to an embodiment of the invention.

FIG. 2 is a flowchart illustrating the steps of using a multi-level authentication system 100 according to an embodiment of the invention. By performing the steps of FIG. 2, service provider application 110 may distinguish between two different parties that are using the same user account of service provider application 110. Accordingly, policies and rules that govern the behavior of parties may be utilized by service provider application 110 and applied to different parties using the same user account. Further, the actions performed by different entities using the same user account may be monitored and audited by embodiments of the invention.

In step 210, a primary authentication credential for each user account supported by service provider application 110 is established. A primary authentication credential is an authentication credential that, when presented to service provider application 110, identifies a particular user account of service provider application 110. Service provider application 110 may support one or more different user accounts. Each of the different user accounts may be, but need not be, associated with a different set of access privileges with respect to resources managed by service provider application 110. Typically, at least one of the user accounts supported by service provider application 110 is an administrator account.

To illustrate an example, consider the embodiment depicted by FIG. 1. In the embodiment of FIG. 1, service provider application 110 is implemented as a DBMS. Service provider application 110 may support two user accounts that are each associated with a primary authentication credential that is implemented as a unique username/password combination. A first user account may be associated with a primary authentication credential implemented using a username of "scott" and a password of "tiger," while the second user account may be associated with a primary authentication credential that is implemented using the username of 'admin" and the password of "secret."

In certain embodiments, if a requesting party submits, to service provider application 110, a primary authentication credential (such as a recognized username and a valid password associated with a particular user account), then service provider application 110 will enable the requesting party to log onto the particular user account. In other embodiments, a requesting party needs to submit both the primary authentication credential associated with a particular user account and a valid secondary authentication credential (described in further detail below) to service provider application 110 in order for service provider application 110 to grant access, to the requesting party, to the particular user account.

Service provider application 110 may perform step 210 by initially assigning a temporary or default primary authentication credential to a particular user account, and may subsequently allow a user to change the primary authentication credential associated with the user account. Alternatively, service provider application 110 may perform step 210 by establishing a username for a particular user account, and requiring a party to establish a password or other such authentication credential the first time a party logs onto the particular user account. Other embodiments of the invention may employ other approaches for establishing a primary authentication credential for a particular user account.

In step 220, one or more secondary authentication credentials for one or more user accounts supported by service provider application 110 are established. A secondary authentication credential is an authentication credential that identifies a particular party that is authorized to use a particular user account. The particular party identified by a secondary authentication credential may be a human user or a computerized entity, such as a software application or a computer system.

In embodiment of the invention, the requesting party may establish a secondary authentication credential with service provider application 110 by establishing a password to use as a secondary authentication credential for a particular user account. Service provider application 110 may prompt, or negotiate with, the requesting party to establish such a password.

To illustrate an example, assume that a human is using client 144 to directly interact with service provider application 110 over communications link 154. The human user may establish a password to use as a secondary authentication credential by interacting with a user interface provided by client 144. After the human user establishes the password, service provider application 100 may store data that identifies the established password and associates the established password with the human user. The human user may remember the password, and may subsequently submit the password to service provider application 110 to enable service provider application 100 to identify the human user.

Alternately, rather than the human user interacting with service provider application 110 directly using communications link 152, the human user may use client 144 to communicate with service provider application 110 via server 130. In such an approach, the human user instructs client 144 to communicate with server 130 over communications link 152, and server 130, in turn, communicates with service provider application 110 over communications link 150. In this embodiment, the human user may establish a password to use a secondary authentication credential using a user interface provided by client 144, and client 144 may transmit the password to server 130, which in turn may communicate the password to service provider application 110 over communications link 150. Thus, regardless of whether client 144 communicates directly with service provider application 110 over communications link 154 or indirectly by communicating with server 130, service provider application 110 is able to discern the real identity of the particular human user of client 144 because only the particular human user would know the password established as the secondary authentication credential for the particular human user.

As a result of associating a secondary authentication credential with a particular human user, service provider application 110 may discern the real identity of each user of each user account, even if multiple users are logged into the same user account, because each user will be associated with a different secondary authentication credential. Thus, service provider application 110 may employ one or more policies and/or rules that govern the behavior of human users regarding their use of user accounts of service provider application 110. In this way, service provider application 110 may assign different human users different access rights to resources managed by service provider application 110, even if multiple human users log onto the same user account of service provider application 110. Further, service provider application 110 may track and/or audit the activity of each human user, even if multiple users log onto the same user account of service provider application 110.

In embodiments of the invention, the requesting party may be a computerized entity, such as a software application or a computer system. Such a computerized entity may negotiate a "secret," password, or token (hereafter simply "token") with service provider application 110 in a manner that is transparent to a human user. This token may be persistently stored by the computerized entity. The computerized entity may be configured to transmit the token to service provider application 110 when the computerized entity requires access to service provider application 110. The token may be composed according to any type of structure or form of digital data which may be recognized and interpreted by service provider application 110 and the requesting party.

As an example, in an embodiment, a secondary authentication credential may be associated with a particular software application, such as server 130 or a software application executing on client 144. The software application may persistently store the secondary authentication credential at or accessible to the software application, such as a digital wallet, storage 132, or storage 146.

As another example, in another embodiment, a secondary authentication credential may be associated with a particular computer system or device, such as client 144 or the computer system or device executing server 130. The particular computer system or device associated with a secondary authentication credential may persistently store the secondary authentication credential in a location at or accessible to the particular computer system or device, such as a digital wallet, storage 132, or storage 146.

As a result of associating a secondary authentication credential with a particular computerized entity, service provider application 110 may discern the real identity of each computerized entity that uses each user account, even if multiple computerized entities are logged into the same user account, because each computerized entity will be associated with a different secondary authentication credential. Thus, service provider application 110 may employ one or more policies and/or rules that govern the behavior of computerized entities regarding their use of user accounts of service provider application 110. In this way, service provider application 110 may assign different computerized entities different access rights to resources managed by service provider application 110, even if multiple computerized entities log onto the same user account of service provider application 110. Further, service provider application 110 may track and/or audit the activity of each computerized entity, even if multiple computerized entities log onto the same user account of service provider application 110.

As a consequence of associating secondary authentication credentials with the various entities that have been allowed a degree of access to service provider application 110, service provider application 110 may employ policies that ensure that certain types of activities are only performed by certain types of entities. For example, service provider application 110 may employ a policy that states that a certain type of database access must originate from a particular type of tool, software application, or computer system. This may be advantageous because system 100 may be designed to enforce security based on what type of tool, software application, or computer system one is using. In this way, for example, system 100 can ensure that a user cannot use a software application to issue unrestricted database commands to database server 120. As another example, service provider application 110 may employ a policy that only allows certain individuals access to use a particular user account, such as an administrator account. In this way, if one acquires the administrator password to the administrator user account through illicit or unofficial means, the user still cannot use the administrator user account because the user does not have access to a valid secondary authentication credential associated with the administrator user account.

Embodiments of the invention may associate secondary authentication credentials with any number of different types of entities. Thus, an embodiment of the invention may associate one or more secondary authentication credentials with human users and one or more secondary authentication credentials with computerized entities.

Note that the entity that performs steps 210 and 220 may be different entities. Further note that the one or more entities that perform steps 210 and 220 may be different entities than the entities that perform steps 230 and 240 described below.

In step 230, upon service provider application 110 receiving a request, from a requesting party, to access a particular user account of service provider application 110, service provider application 110 determines if the requesting party has presented (a) a primary authentication credential associated with the particular user account and (b) one or more valid secondary authentication credentials associated with the particular user account.

In an embodiment, service provider application may require the requesting party to submit two or more secondary authentication credentials, namely, one secondary authentication credential that identifies the human user, and one or more other secondary authentication credentials that identify a computerized entity associated with the human user, such as the particular computer system or the particular software application the human user is using to submit the request to service provider application 110. In other embodiments of the invention, a single secondary authentication credential may be designed to identify two or more entities, such as the human user and a computerized entity associated with the human user, i.e., the human user's computer system or software application. Alternatively, a single entity, such as the human user or a computerized entity, may be identified by the secondary authentication credential submitted in step 230.

Since embodiments of the invention may require the requesting party to submit any number of secondary authentication credentials, embodiments of the invention may employ an arbitrary number of levels of authentication to fit different implementations, environments, and/or deployment models. For example, one embodiment may require a requesting party to submit a single secondary authentication credential that uniquely identifies the identity of the requesting user; however, another embodiment may require a requesting party to submit three secondary authentication credentials that collectively uniquely identify: (a) the identity of the requesting user, (b) the particular computer system used by the requesting user, and (c) the identity of the network to which the particular computer system, used by the requesting user, is connected. Thus, the number of the secondary authentication credentials required by embodiments of the invention and the nature of the things identified by a secondary authentication credential (for example, whether a person, machine, or network is identified by the secondary authentication credential) is configurable to accommodate a wide variety of security policies and deployment environments.

In step 240, upon service provider application 110 determining that the requesting party has submitted (a) a primary authentication credential associated with the particular user account and (b) at least one valid secondary authentication credential associated with the particular user account, service provider application 110 grants, to the requesting party, limited access to the particular user account.

The scope of the limited access granted to the requesting party may be based upon the secondary authentication credential submitted by the requesting party. To illustrate, if two different users requested access to use the same user account, each user could be granted access to the user account by service provider application 110, but service provider application may grant different access privileges to each user based upon the actual identity of each user. Thus, service provider application 110 may determine what actions a particular requesting party is allowed to perform using a particular user account based upon the identity of the requesting party as identified by the secondary authentication credential.

The limited access granted to the requesting party may be implemented in different manners by different embodiments of the invention. For example, the limited access granted to a requesting party may correspond to one or more of limited authorization, limited resources, and limited priorities.

In an embodiment, a requesting party may have a different scope of access privileges using different user accounts. Thus, when a user logs onto a first user account, the user may have a different set of access privileges than when the user logs onto a second user account. In this way, a requesting party may log onto multiple user accounts, and may have a different scope of access to access resources managed by service provider application 110 using each user account.

If the service provider application 110 determines that the requesting party has not presented (a) a primary authentication credential associated with a requested user account and (b) a valid secondary authentication credential associated with the requested user account, service provider application 110 may deny access to the requested user account. Service provider application 110 may employ policies for handling situations where requesting users do not supply valid authentication credentials. For example, depending upon the context in which system 100 is implemented, it may be appropriate to allow the requesting party to try a certain number of times to successfully log onto a particular user account before service provider application 110 performs a responsive action, such as disabling the requested user account or alerting an administrator. In other contexts, it may be appropriate to immediately notify an administrator or disable the requested user account whenever a requesting party is unsuccessfully attempts to log onto a requested user account.

Granting Partial Access Prior to Receipt of the Secondary Authentication Credential Service provider application 110 can prompt a requesting party for a secondary credential at any time. For example, service provider application 110 may request that the requesting party submit the secondary authentication credential at the same time as the primary authentication credential is submitted. However, in other embodiments, service provider application 110 may request that the requesting party submit the secondary authentication credential after the requested party has submitted the primary authentication credential and has already been granted access to the requested user account associated with the submitted primary authentication credential. In this way, a requested party may be granted a limited scope of access to resources managed by service provider application 110 by virtue of presenting a valid primary authentication credential to service provider application 110, and after presenting a valid secondary authentication credential to service provider application 110, the requesting party may be granted a greater scope of access to resources managed by service provider application 110.

A requesting party which has already been granted limited access to use a particular user account of service provider application 110, by virtue of presenting a primary authentication credential to service provider application 110, may be prompted or requested to submit a valid secondary authentication credential for the particular user account being used by the requesting party when the requesting party requests access to sensitive resources managed by service provider application 110. For example, if the requesting party, whom has already been granted limited access to use a particular user account, submits a request to service provider application 110 to access certain sensitive data, such as social security numbers or salary information, the requesting user may be prompted, by service provider application 110, to submit a valid secondary authentication credential that has been assigned access to those sensitive resources prior to service provider application 110 providing access to those sensitive resources. In this way, a user who does not have a need to access sensitive data, but does have a need to perform certain activities, may use a particular user account of service provider application 110 without supplying a secondary authentication credential.

To illustrate, in an embodiment, upon the requesting party presenting a valid primary authentication credential to service provider application 110, service provider application 110 grants the requesting party a first set of access privileges. The first set of access privileges does not grant, to the requesting party, access to a particular data item managed by service provider application 110. In response to the service provider application 110 receiving a request, from the requesting party, to access the particular data item, service provider application 110 prompts the requesting party to submit a valid secondary authentication credential, associated with the user account, which does have access to the requested particular data item. Upon service provider application 110 receiving, from the requesting party, a valid secondary authentication credential which has access to the requested particular data item, service provider application 110 grants the requesting party a second set of access privileges which provides, to the requesting party, access to the particular data item. If service provider application 110 does not receive, from the requesting party, a valid secondary authentication credential which has access to the requested particular data item, then service provider application 110 does not grant the requesting party a second set of access privileges which provides, to the requesting party, access to the particular data item, and instead, follows any policies or rules of service provider application 110 for handling incorrect authentication credentials.

Providing Authentication Status to Other Systems

Embodiments of the invention may notify other entities or otherwise make available information describing how many levels of authentication and/or what types of authentication that a particular requesting party successfully and/or unsuccessfully underwent. Such information may be used by other computerized entities when interacting with the requesting party after they have been authenticated. Embodiments may expose an attribute that describes or characterizes this information, and other entities may query or retrieve the attribute. Other embodiments of the invention may notify particular consumers (such as a security system) of this information when it becomes available.

For example, a security system may use such information (i.e., how many levels and types of authentication the requesting party successfully underwent) in determining what type of access privileges to grant to the requesting party. In this way, if a requesting party undergoes a relatively rigorous type of authentication (for example, a large number of authentication levels or a strenuous type of authentication), then the requesting party may be granted a relatively larger amount of access privileges in recognition of the fact that the user has established their identity to a high degree of certainty. On the other hand, if a requesting party undergoes a relatively weak type of authentication, and the requesting party submits an incorrect password multiple times or otherwise has one or more failed authentication attempts, then the requesting party may be granted a relatively weaker amount of access privileges in recognition of the fact that the user has not established their identity to a high degree of certainty.

Implementing Mechanisms

Figure 3:
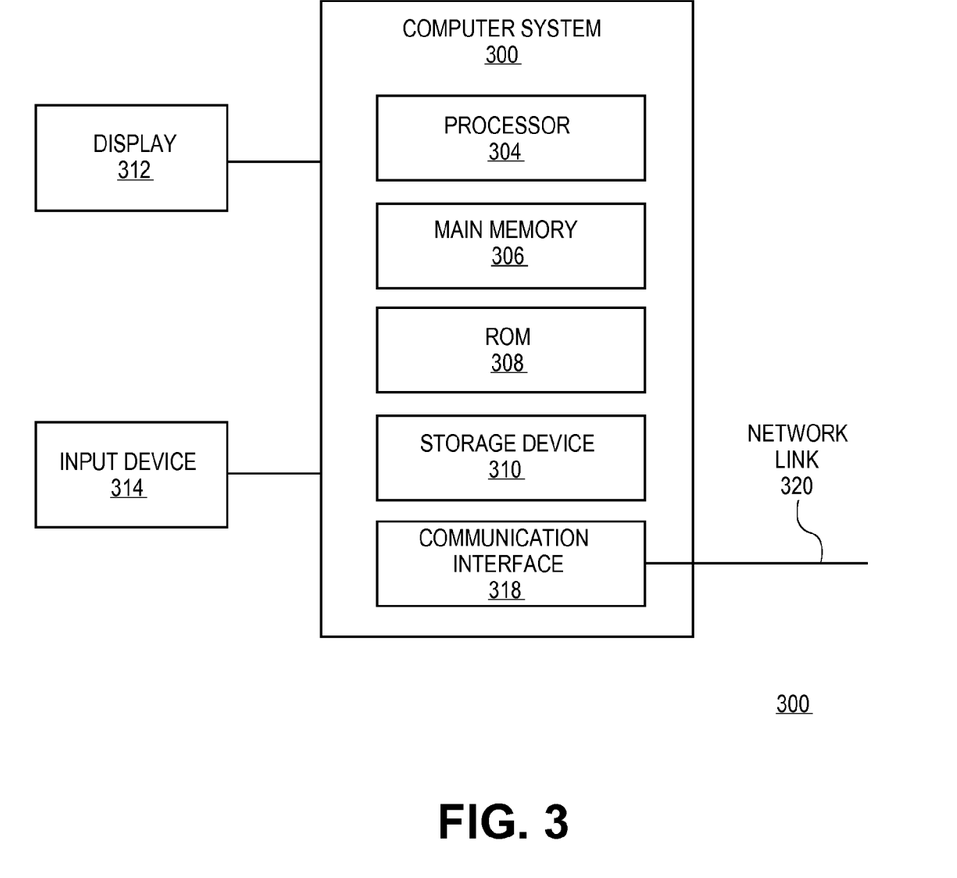
FIG. 3 is a block diagram that illustrates a computer system upon which an embodiment of the invention may be implemented.

In an embodiment, one or more of software application 110, database server 120, database 122, server 130, and clients 140, 142, and 144 may each be implemented using a computer system. FIG. 3 is a block diagram that illustrates a computer system 300 upon which an embodiment of the invention may be implemented. In an embodiment, computer system 300 includes processor 304, main memory 306, ROM 308, storage device 310, and communication interface 318.

Computer system 300 includes at least one processor 304 for processing information. Computer system 300 also includes a main memory 306, such as a random access memory (RAM) or other dynamic storage device, for storing information and instructions to be executed by processor 304. Main memory 306 also may be used for storing temporary variables or other intermediate information during execution of instructions to be executed by processor 304. Computer system 300 further includes a read only memory (ROM) 308 or other static storage device for storing static information and instructions for processor 304. A storage device 310, such as a magnetic disk or optical disk, is provided for storing information and instructions.

Computer system 300 may be coupled to a display 312, such as a cathode ray tube (CRT), a LCD monitor, and a television set, for displaying information to a user. An input device 314, including alphanumeric and other keys, is coupled to computer system 300 for communicating information and command selections to processor 304. Other non-limiting, illustrative examples of input device 314 include a mouse, a trackball, or cursor direction keys for communicating direction information and command selections to processor 304 and for controlling cursor movement on display 312. While only one input device 314 is depicted in FIG. 3, embodiments of the invention may include any number of input devices 314 coupled to computer system 300.

Embodiments of the invention are related to the use of computer system 300 for implementing the techniques described herein. According to one embodiment of the invention, those techniques are performed by computer system 300 in response to processor 304 executing one or more sequences of one or more instructions contained in main memory 306. Such instructions may be read into main memory 306 from another machine-readable medium, such as storage device 310. Execution of the sequences of instructions contained in main memory 306 causes processor 304 to perform the process steps described herein. In alternative embodiments, hard-wired circuitry may be used in place of or in combination with software instructions to implement embodiments of the invention. Thus, embodiments of the invention are not limited to any specific combination of hardware circuitry and software.

The term "non-transitory machine-readable storage medium" as used herein refers to any non-transitory medium that participates in storing instructions which may be provided to processor 304 for execution. Such a non-transitory medium may take many forms, including but not limited to, non-volatile media and volatile media. Non-volatile media includes, for example, optical or magnetic disks, such as storage device 310. Volatile media includes dynamic memory, such as main memory 306.

Non-limiting, illustrative examples of non-transitory machine-readable media include, for example, a floppy disk, a flexible disk, hard disk, magnetic tape, or any other magnetic medium, a CD-ROM, any other optical medium, a RAM, a PROM, and EPROM, a FLASH-EPROM, any other memory chip or cartridge, or any other non-transitory medium from which a computer can read.

Various forms of non-transitory machine readable media may be involved in carrying one or more sequences of one or more instructions to processor 304 for execution. For example, the instructions may initially be carried on a magnetic disk of a remote computer. The remote computer can load the instructions into its dynamic memory and send the instructions over a network link 320 to computer system 300.

Communication interface 318 provides a two-way data communication coupling to a network link 320 that is connected to a local network. For example, communication interface 318 may be an integrated services digital network (ISDN) card or a modem to provide a data communication connection to a corresponding type of telephone line. As another example, communication interface 318 may be a local area network (LAN) card to provide a data communication connection to a compatible LAN. Wireless links may also be implemented. In any such implementation, communication interface 318 sends and receives electrical, electromagnetic or optical signals that carry digital data streams representing various types of information.

Network link 320 typically provides data communication through one or more networks to other data devices. For example, network link 320 may provide a connection through a local network to a host computer or to data equipment operated by an Internet Service Provider (ISP).

Computer system 300 can send messages and receive data, including program code, through the network(s), network link 320 and communication interface 318. For example, a server might transmit a requested code for an application program through the Internet, a local ISP, a local network, subsequently to communication interface 318. The received code may be executed by processor 304 as it is received, and/or stored in storage device 310, or other non-volatile storage for later execution.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. One or more non-transitory machine-readable storage media storing one or more sequences of instructions, which when executed by one or more processors, cause:
   upon receiving a request, from a requesting party, to access a software application using a particular user account, authenticating a primary authentication credential and a secondary authentication credential submitted by the requesting party, wherein the primary authentication credential uniquely identifies the particular user account of the software application, and wherein the secondary authentication credential uniquely identifies a particular party authorized to use the particular user account; and
   upon successfully authenticating the primary authentication credential and the secondary authentication credential submitted by the requesting party, granting the requesting party limited access to the software application using the particular user account, wherein the scope of the limited access granted to the requesting party is based upon the secondary authentication credential submitted by the requesting entity.

2. The one or more non-transitory machine-readable storage media of claim 1, wherein the particular party identified by the secondary authentication credential is a human user.

3. The one or more non-transitory machine-readable storage media of claim 1, wherein the particular party identified by the secondary authentication credential is a computer system.

4. The one or more non-transitory machine-readable storage media of claim 1, wherein the software application is a first software application, and wherein the particular party identified by the secondary authentication credential is a second software application.

5. The one or more non-transitory machine-readable storage media of claim 1, wherein the primary authentication credential comprises a user name and a password associated with the particular user account and wherein the secondary authentication credential comprises a secret password that is transparent to a human user.

6. The one or more non-transitory machine-readable storage media of claim 1, wherein the software application is a first software application, wherein the secondary authentication credential identifies a device or a second software application that is authorized to use the particular user account, wherein the secondary authentication credential is a token that is stored by the device or the second software application, and wherein the device or the second software application is configured to transmit the token to the first software application when the requesting party requires access to the first software application.

7. The one or more non-transitory machine-readable storage media of claim 1, wherein the software application is a first software application, and wherein secondary authentication credential identifies both (a) the particular user authorized to use the particular account and (b) a particular device authorized to use the particular account or a second software application authorized to use the particular account.

8. The one or more non-transitory machine-readable storage media of claim 1, wherein the software application is an email server.

9. The one or more non-transitory machine-readable storage media of claim 1, wherein the software application is a database management system.

10. The one or more non-transitory machine-readable storage media of claim 1, wherein authenticating the primary authentication credential and the secondary authentication credential submitted by the requesting party comprises:
    upon receiving the primary authentication credential, granting the requesting party a first set of access privileges;
    in response to receiving, from the requesting party, a request to access a particular data item managed by the software application, the software application prompting the requesting party to submit the secondary authentication credential, wherein the first set of access privileges does not grant access to the particular data item; and
    upon the software application receiving, from the requesting party, the secondary authentication credential, the software application granting the requesting party a second set of access privileges, wherein the second set of access privileges does grant to the particular data item.

11. The one or more non-transitory machine-readable storage media of claim 1, wherein the secondary authentication credential is a first secondary authentication credential, wherein a second secondary authentication credential is received in association with the request, wherein the first secondary authentication credential identifies a different entity than the second secondary authentication credential, and wherein the scope of the limited access granted to the requesting party is based on both the first secondary authentication credential and the second secondary authentication credential.

12. The one or more non-transitory machine-readable storage media of claim 1, wherein execution of the one or more sequences of instructions further causes:
providing, to a security system, authentication information, about how many levels of authentication and what types of authentication the requesting party successfully performed, wherein the security system uses the authentication information to determine access privileges for the requesting party.

13. A machine-implemented method for performing multiple-level authentication, comprising:
upon receiving a request, from a requesting party, to access a software application using a particular user account, authenticating a primary authentication credential and a secondary authentication credential submitted by the requesting party, wherein the primary authentication credential uniquely identifies the particular user account of the software application, and wherein the secondary authentication credential uniquely identifies a particular party authorized to use the particular user account; and
upon successfully authenticating the primary authentication credential and the secondary authentication credential submitted by the requesting party, one or more processors granting the requesting party limited access to the software application using the particular user account, wherein the scope of the limited access granted to the requesting party is based upon the secondary authentication credential submitted by the requesting entity.

14. The method of claim 13, wherein the particular party identified by the secondary authentication credential is a human user.

15. The method of claim 13, wherein the particular party identified by the secondary authentication credential is a computer system.

16. The method of claim 13, wherein the software application is a first software application, and wherein the particular party identified by the secondary authentication credential is a second software application.

17. The method of claim 13, wherein the secondary authentication credential identifies a human user authorized to use the particular user account, and wherein the secondary authentication credential is a password that is established by the human user.

18. The method of claim 13, wherein the software application is a first software application, wherein the secondary authentication credential identifies a device or a second software application authorized to use the particular user account, wherein the secondary authentication credential includes a token that is stored by the device or the second software application authorized to use the particular user account, and wherein the device or the second software application authorized to use the particular user account is configured to transmit the token to the first software application when the requesting party requires access to the first software application.

19. The method of claim 13, wherein the software application is a first software application, and wherein secondary authentication credential identifies both (a) the particular user authorized to use the particular account and (b) a particular device authorized to use the particular account or a second software application authorized to use the particular account.

20. The method of claim 13, wherein the software application is an email server.

21. The method of claim 13, wherein the software application is a database management system.

22. The method of claim 13, wherein determining if the requesting user has presented, to the software application, the set of primary authentication credentials and the set of secondary authentication credentials comprises:
upon receiving the primary authentication credential, granting the requesting party a first set of access privileges;
in response to receiving, from the requesting party, a request to access to a particular data item managed by the software application, the software application prompting the requesting party to submit the secondary authentication credential, wherein the first set of access privileges does not grant access to the particular data item; and
upon the software application receiving, from the requesting party, the secondary authentication credential, the software application granting the requesting party a second set of access privileges, wherein the second set of access privileges does grant to the particular data item.

23. The method of claim 13, wherein the secondary authentication credential is a first secondary authentication credential, wherein a second secondary authentication credential is received in association with the request, and wherein the first secondary authentication credential identifies a different entity than the second secondary authentication credential, and wherein the scope of the limited access granted to the requesting party is based on both the first secondary authentication credential and the second secondary authentication credential.

24. The method of claim 13, further comprising:
providing, to a security system, authentication information, about how many levels of authentication and what types of authentication the requesting party successfully performed, wherein the security system uses the authentication information to determine access privileges for the requesting party.

25. An apparatus for performing multiple-level authentication, comprising:
one or more processors; and
a non-transitory machine-readable medium storing one or more sequences of instructions, which when executed by the one or more processors, cause:
upon receiving a request, from a requesting party, to access a software application using a particular user account, authenticating a primary authentication credential and a secondary authentication credential submitted by the requesting party, wherein the primary authentication credential uniquely identifies the particular user account of the software application, and wherein the secondary authentication credential uniquely identifies a particular party authorized to use the particular user account; and
upon successfully authenticating the primary authentication credential and the secondary authentication credential submitted by the requesting party, granting the requesting party limited access to the software application using the particular user account, wherein the scope of the limited access granted to the requesting party is based upon the secondary authentication credential submitted by the requesting entity.

* * * * *